United States Patent [19]
Wilwerding

[11] 4,207,461
[45] Jun. 10, 1980

[54] CONTINUOUS FOCUS PROPORTIONAL CONTROLLER

[75] Inventor: Dennis J. Wilwerding, Littleton, Colo.

[73] Assignee: Honeywell, Inc., Minneapolis, Minn.

[21] Appl. No.: 834,760

[22] Filed: Sep. 19, 1977

[51] Int. Cl.² ............................................. G01J 1/20
[52] U.S. Cl. ..................................... 250/201; 250/204
[58] Field of Search ............... 250/201, 204, 208, 209; 356/1, 4; 354/25

[56] References Cited
U.S. PATENT DOCUMENTS

| | | | |
|---|---|---|---|
| 3,682,071 | 8/1972 | Hojoe | 356/4 |
| 3,958,117 | 5/1976 | Stauffer | 250/201 |

Primary Examiner—David C. Nelms
Attorney, Agent, or Firm—Charles J. Ungemach

[57] ABSTRACT

An improved automatic continuous focus system of the spatial image correlation type determines whether focus correction is needed and in which direction and moves the lens with a proportional drive in accordance with these determinations. The focus motor may be operated continuously for large focus errors to allow smoother lens motion and faster response without increased motor requirements, a large active scan duty cycle may be provided, minimum drive pulses may be utilized for zero focus errors so as to overcome static friction in the lens drive and improve the focus accuracy and electronic debouncing of switches may be accomplished.

11 Claims, 3 Drawing Figures

CONTINUOUS FOCUS PROPORTIONAL CONTROLLER

BACKGROUND OF THE INVENTION

The present invention relates generally to apparatus for providing a measure of the distance between the apparatus and an object. In particular, the present invention is directed to automatic focusing systems in which a primary optical means, such as the taking lens of a camera, is moved to maintain an image of the object in focus at the plane of a photographic film.

One highly advantageous type of automatic focus apparatus is the spatial image correlation type. Examples of the different forms of arrangements of this type can be found in copending U.S. patent application Ser. No. 700,963, filed June 29, 1976, by Norman L. Stauffer, and assigned to the same assignee as the present invention; in U.S. Pat. Nos. 3,836,772; 3,838,275; 3,958,117; and No. 4,002,899; by Norman L. Stauffer, and in U.S. Pat. No. 3,274,914, by K. Biederman, et al.

In my copending application Ser. No. 743,189, filed Nov. 19, 1976, and assigned to the assignee of the present invention, I provide a continuous automatic focus system that produces an operation that occurs only with respect to the position of the major extremum to supply an accurate focus correction signal and to drive the lens in an appropriate direction to achieve proper focus. In my copending application Ser. No. 804,111, filed June 6, 1977, I provide an improved continuous automatic focus system which permits proportional control, that is, driving of the motor to position the lens at relatively high rates for large errors and reducing the speed of the motor drive at small errors to prevent overshoot and focus oscillation. In this latter application, the motor can only drive the lens during the return portion of the mirror drive cycle even though the error may be large which limits the speed at which the system may achieve a focus condition. The prior art also suffers a problem in the area of very small focus errors in that the lens stops even though there is remaining a small error due to the fact that static friction must be overcome in order to move the lens. Another problem encountered in the prior art stems from the fact that mechanical switches tend to bounce upon closure and in systems such as automatic focus where timing of events is critical, the bouncing switch contact may produce errors. Also, the prior art continuous focus proportional controller was limited by the fact that the scan and return cycles were of equal duration. If the active scan cycle could be made a larger portion of the total scan cycle, the angular velocity of the scan mirror may be reduced so as to decrease the focus delay for improved low illumination operation.

SUMMARY OF THE INVENTION

The system of the present invention is a continuous automatic focus system with proportional drive that allows the lens drive motor to operate during both the scan and return portions of the cycle or even continuously for large focus errors and which provides a small minimum drive pulse near the zero focus error which overcomes the static friction in the lens drive. The system also permits characterization of the scan cycle so that the scanning mirror may actively scan the field of view during a larger portion of the cycle than was possible in the previous systems and overcomes the problems associated with switch contact bounce so that only the initial closure of mechanical switches involved operates to produce the control effects desired.

The advantages of having continuous motor drive for large focus errors is that it allows smoother lens drive operation and accomplishes the lens drive with smaller focus motors. The advantage of having a larger portion of the scan cycle involved with the active scanning of the field of view, lies in the fact that the photo diodes which receive light from the field of view in the prior art have an inherent capacitance and the small photo current which exists at low illumination produces an actual correlation peak that lags slightly the true location of the correlation peak. This time delay causes a focus shift, or error, at very low illuminations. In the present invention as the velocity of the scan mirror is reduced, the effective delay involved is proportionally reduced, thus improving the accuracy. The accuracy is also improved under fluorescent illumination for the same reason.

DETAILED DESCRIPTION OF THE PREFERRED EMBODIMENTS

Figure 1:
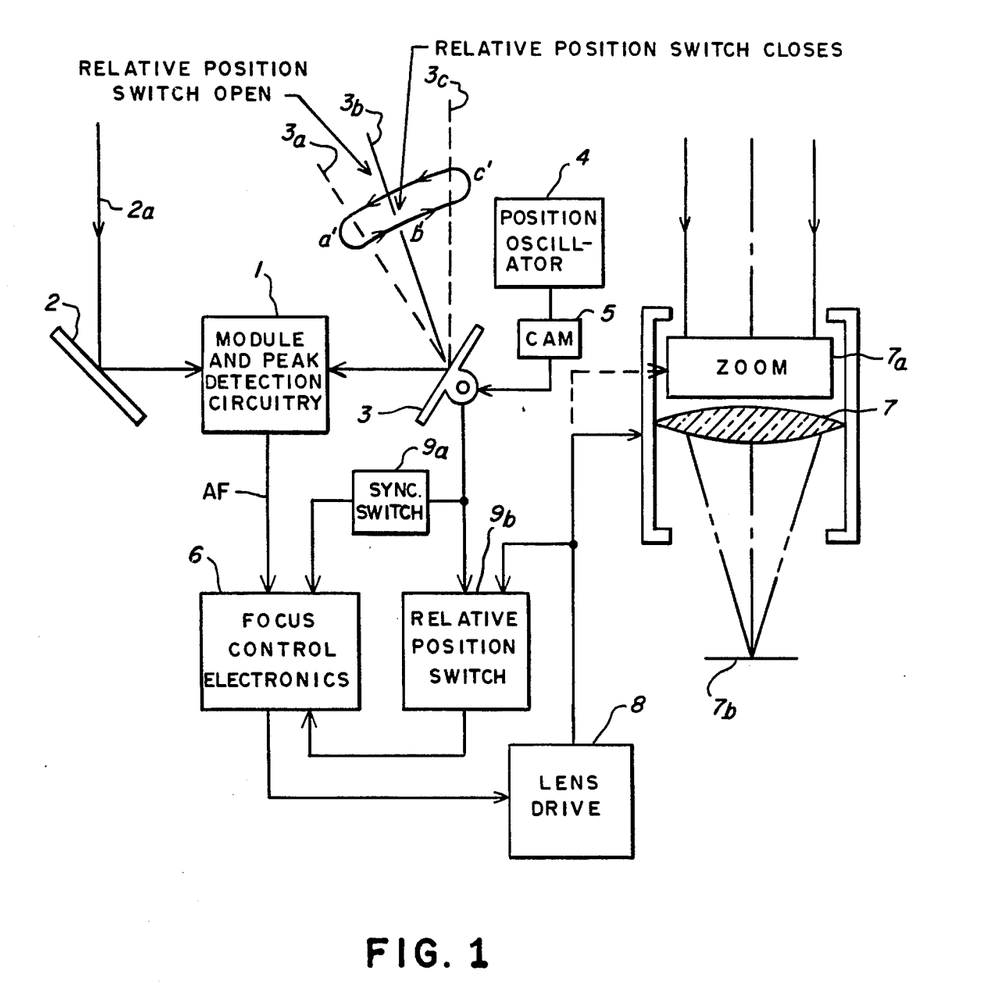
FIG. 1 shows a block diagram of the continuous focus proportional control system of the present invention.

In FIG. 1 the system includes a module and peak detection circuitry block identified by reference numeral 1, which may be like that described in the above-mentioned copending application Ser. No. 804,111. Mirrors 2 and 3 are shown with mirror 3 being rotatable about an axis perpendicular to the plane of FIG. 1. Mirror 2 provides an optical path 2 for radiation to travel from the field of view being scanned to module 1 and mirror 3 provides an optical path to module 1 for radiation from the field of view at various positions therein depending upon the angular position of mirror 3. Three of these optical paths are shown as 3a, 3b, and 3c, respectively, in FIG. 1.

A position oscillator, or drive mechanism 4, is shown operating through a cam or other motion characterizing means 5, to move mirror 3 back and forth across the field of view being scanned.

Module 1 receives the radiation from the mirrors 2 and 3 and determines where the best correlation of radiation on detectors in the module occurs so as to produce an autofocus signal which will change from a low level or "0" magnitude to a high level or "1" magnitude whenever a peak in the correlation signal occurs. Since there may be several peaks encountered during a single scan, the autofocus signal may change from a "1" back to a "0" and back to a "1" several times during a single scan but the last of the transitions from "0" to "1" is indicative of the major peak and thus of the actual desired focus position. All of this is more completely described in the above-mentioned copending application serial number 804,111 and in the abovementioned Stauffer U.S. Pat. No. 4,002,899.

In FIG. 1, the autofocus signal is shown being presented from module 1 to focus control electronics 6, the operation of which will be explained in detail hereinafter. The output of the focus control electronics 6 is a signal whose pulse width varies with the amount of error between the present position of a lens 7, which may include zoom optics 7a, and the desired position of such lens in order to provide a properly focused image of an object in the field of view upon a plane 7b, which may be the plane of the film of a camera. This signal of varying pulse width from focus control electronics 6 is presented to a lens drive mechanism or motor 8, whose output is connected by gears or other drive means, to the lens 7 and zoom optics 7a for purposes of properly positioning them.

As mirror 3 moves through the field of view being scanned, a sync switch 9a will produce a signal at both the start and the finish of the active portion of the scan. Thus, in FIG. 1, if mirror 3 starts from a position a' which is a little nearer than the position where radiation from a very near object moves along path 3a to module 1, sync switch 9a will produce a signal which may be in the form of a transition from "0" to "1". When mirror 3 has moved to a position c' which is a little farther than the position where it is receiving radiation from a very far object or at infinity along a path such as 3c, sync switch 9a will produce a signal such as a transition from "1" back to a "0". Thus, the focus control electronics is aware of the beginning and the end of each active scan cycle. The mirror 3 may then be returned to its initial starting position and as is shown in FIG. 1, continually oscillates from position a', to position c' and back. Somewhere in its travel between position a' and c', mirror 3 will occupy a position b' in which it is receiving radiation from some portion of the field of view indicative of where the lens 7 and zoom optics 7a may be focusing. In this position radiation from the field of view travels along path 3b to module 1. At this point in its travel, a relative position or "window" switch 9b, which is shown connected both to the lens drive mechanism 8 and to the mirror 3, produces a signal which is presented to the focus control electronics 6. As indicated in the upper part of FIG. 1, the relative position switch will be open between points a' and b' in the cycle but will close at position b' and remain closed during the cycle from position b' through position c' until it again arrives at position b', where it will again open. The signal to the focus control electronics may be a "1", whenever the relative position switch is open and may be a "0" whenever the relative position switch is closed. The sync switch 9a and relative position or "window" switch 9b may take a variety of different forms, depending upon the particular mechanical embodiment of the lens drive 8 and position oscillator 4 but should be able to operate for many cycles and should be capable of factory adjustments so as to permit system alignment. An example of a switch which may be used may be found in the above-mentioned Stauffer application Ser. No. 700,963.

Figure 2:
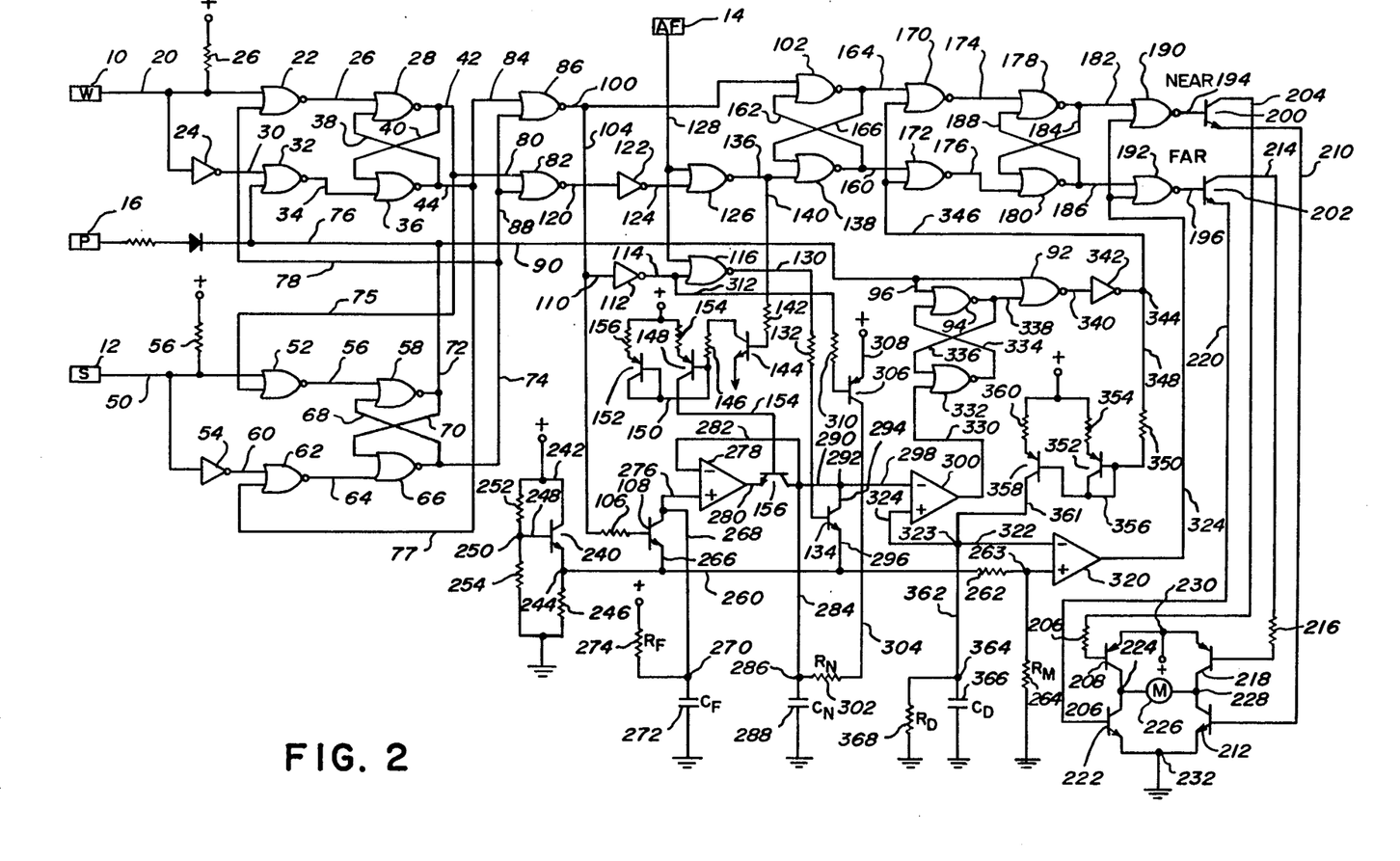
FIG. 2 is a schematic diagram of the continuous foucs proportional control electronics of the present invention.

FIG. 2 shows a schematic diagram of the preferred embodiment of the continuous automatic focus proportional control electronics of the present invention. A terminal 10 is shown as a box containing the letter "W" representing the input from the "window" or relative position switch 9b of FIG. 1, a terminal 12 is shwon as a box containing the letter "S" representing the input from the "sync" switch 9a of FIG. 1 and a terminal 14 is shown as a box with the letters "AF" representing the autofocus signal from the module 1 of FIG. 1.

Also shown in FIG. 2 is a terminal 16 which is shown as a box containing the letter "P". This terminal is connected to the detector output of the peak detection circuitry described in the above-mentioned copending application Ser. No. 804,111. Terminal 16 is an output of the present invention, the purpose of which is to remove the charge on the holding capacitor of the system whenever the sync switch operates at the completion of a scan and will not be further described herein.

The system of FIG. 2 will utilize the signals appearing on terminals 10, 12 and 14, to drive a motor in a first or second direction so that the primary optical element or lens of a system, such as a camera, may be positioned for best focus.

As seen in FIG. 2, terminal 10 is connected by a conductor 20 to one input of a NOR gate 22, to the input of an inverter 24 and through a resistor 26 to the system's source of positive potential. The output of NOR gate 22 is connected by a conductor 26 to one input of a NOR gate 28. The output of inverter 24 is connected by a conductor 30 to one input of a NOR gate 32. The output of NOR gate 32 is connected by a conductor 34 to one input of a NOR gate 36. The output of NOR gate 36 is connected by a conductor 38 to the other input of NOR gate 28 and the output of NOR gate 28 is connected by a conductor 40 to the other input terminal of NOR gate 36. In this configuration, NOR gates 22, 28, 32 and 36, along with inverter 24 comprise a first flip-flop, the non-inverted output of which is the output of NOR gate 28 on conductor 42 and the inverted output of which is the output of NOR gate 36 on conductor 44.

The sync switch terminal 12 is shown connected by a conductor 50 to one input terminal of a NOR gate 52, to the input of an inverter 54 and through a resistor 56 to the system source of positive potential. The output of NOR gate 52 is connected by a conductor 56 to one input of a NOR gate 58. The output of inverter 54 is connected by a conductor 60 to one input of a NOR gate 62, the output of which is connected by a conductor 64 to one input of a NOR gate 66. The output of NOR gate 66 is connected by a conductor 68 to the other input of NOR gate 58 and the output of NOR gate 58 is connected by a conductor 70 to the other input of NOR gate 66. NOR gates 52, 58, 62 and 66, along with inverter 54 comprise a second flip-flop, the non-inverted output of which is the output of NOR gate 58 on conductor 72 and the inverted output of which is the output of NOR gate 66 on conductor 74.

The two flip-flops above-described are crossconnected so as to operate as a sort of third overall flip-flop. To this end, the non-inverted output of the first flip-flop circuit on conductor 42 is connected by a conductor 75 to the other input terminal of NOR gate 52 in the second flip-flop circuit. Likewise, the non-inverted output of the second flip-flop circuit appearing on conductor 72 is connected by a conductor 76 to the other input terminal of NOR gate 32 in the first flip-flop circuit. In similar fashion, the inverted output of the first flip-flop circuit on conductor 44 is connected by a conductor 77 to the second input terminal of the NOR gate 62 in the second flip-flop circuit, while the inverted output of the second flip-flop circuit on conductor 74 is connected by a conductor 78 to the other input terminal of NOR gate 22 in the first flip-flop circuit.

It is these two cross-coupled flip-flops which operate to provide electronic "debouncing" of the window and sync switches. In other words, when mechanical switches close or open, they may tend to bounce on their contacts producing a series of separate signals which is undesirable particularly in a system such as the present one which requires very close timing. The cross-coupled flip-flops will accept the first closure or opening of the bouncing switches and will ignore any further bouncing contacts that may result so long as the switches operate alternately and the bouncing of the contacts do not overlap. This allows for accurate mechanical positioning of the switch closing point and provides improved focus accuracy. A more detailed description of the operation of the cross-coupled flip-flops will be set forth hereinafter.

The non-inverted output of the first flip-flop circuit on conductor 42 is presented by a conductor 80 to one input of a NOR gate 82 and the inverted output of the first flip-flop circuit on conductor 44 is presented by a conductor 84 to one input of a NOR gate 86. The other input of both NOR gate 82 and NOR gate 86 are connected by a conductor 88 to the inverted output of the second flip-flop circuit appearing on the conductor 74. The non-inverting output of the second flip-flop circuit appearing on conductor 72 is connected by a conductor 90 to the one input of a NOR gate 92 and to one input of a NOR gate 94 by a conductor 96.

The output of NOR gate 86 is connected by a conductor 100 to one input of a NOR gate 102. Conductor 100 is also connected by way of a conductor 104 and a resistor 106 to the base of an NPN transistor 108. Transistor 108 will become conductive whenever the output of NOR gate 86 is a logical "1" and will become non-conductive whenever the output of NOR gate 86 is a logical "0". Conductor 104 is also connected by a conductor 110 to the input of an inverter 112, which has its output connected by conductor 114 to one input of a NOR gate 116.

The output of NOR gate 82 is connected by a conductor 120 to the input of an inverter 122 having its output connected by a conductor 124 to one input of a NOR gate 126. The other terminals of NOR gates 116 and 126 are connected by conductor 128 to the autofocus terminal 14. It is seen that as the autofocus signal changes from a "0" signal to a "1" signal and back during a scan, NOR gate 116 and 126 will receive the signals and will change states or not depending upon the outputs of NOR gates 82 and 86 which are representative of the conditions of the window and sync switches.

The output of NOR gate 116 is connected by a conductor 130 through a resistor 132 to the base of an NPN transistor 134. Transistor 134 will become conductive whenever the output of NOR gate 116 is a logical "1" and will become non-conductive whenever the output of NOR gate 116 is a logical "0".

The output of NOR gate 126 is connected by a conductor 136 to one input of a NOR gate 138 and by a conductor 140 through resistor 142 to the base of an NPN transistor 144. Transistor 144 will become conductive whenever the output of NOR gate 126 is a logical "1" and will become non-conductive whenever the output of NOR gate 126 is a logical 37 0". The emitter of transistor 144 is connected to signal ground while the collector is connected through a resistor 146 to the base terminal of a PNP transistor 148. The base of transistor 148 is connected by a conductor 150 to the base and collector terminals of a PNP transistor 152. The emitters of transistors 148 and 152 are connected through resistors 154 and 156, respectively, to the system source of positive potential. The collector of transistor 148 is connected by a conductor 154 to the base of an NPN transistor 156. The transistors 148 and 152 are substantially identical and when connected as shown operate as a current "mirror", which is well known in the state of the art. As such, transistor 148 acts as a constant current source when it is in a conductive state for the supply of a signal to the transistor 156. When such a signal exists, transistor 156 will become conductive and when such signal disappears, transistor 156 will become non-conductive.

NOR gate 138 is connected to NOR gate 102 in the upper middle part of FIG. 2 in a flip-flop arrangement whereby the output of NOR gate 138 on conductor 160 is connected by a conductor 162 to the other input of NOR gate 102, while the output of NOR gate 102 on conductor 164 is connected by a conductor 166 to the other input of NOR gate 138. Conductor 164 is connected to one input of a NOR gate 170 and conductor 160 is connected to one input of a NOR gae 172. The output of NOR gates 170 and 172 are connected by conductors 174 and 176, respectively, to one input of a NOR gate 178 and a NOR gate 180, respectively. NOR gates 1778 and 180 are again connected in flip-flop fashion with the output of NOR gate 178 on conductor 182 being connected by a conductor 184 to the other input of NOR gate 180 and the output of NOR gate 180 on conductor 186 being connected by a conductor 188 to the other input terminal of NOR gate 178.

The outputs of NOR gates 178 and 180 on lines 182 and 186 are connected to the one input terminal of a NOR gate 190 and a NOR gate 192, respectively. The outputs of NOR gates 190 and 192 on conductors 194 and 196, respectively, are connected to the base of an NPN transistor 200 and to the base of an NPN transistor 202, respectively. As will be explained later in detail, transistors 200 and 202 operate to control the motor circuitry for the motor which drives the lens of the system to a focus position. The direction of drive is either from "far" to "near" as will occur when the output of NOR gate 190 is a logical "1" which causes transistor 200 to become conductive or it will be from "near" to "far", which will occur when the output of NOR gate 192 is a logical "1", which causes transistor 202 to become conductive. The circuit operates so that the outputs of NOR gates 190 and 192 do not both have a logical "1" at the same time.

The collector of transistor 200 is connected by a conductor 204 through a resistor 206 to the base of a PNP transistor 208. The emitter of transistor 200 is connected by a conductor 210 to the base of an NPN transistor 212. The collector of transistor 202 is connected by a conductor 214 through a resistor 216 to the base of a PNP transistor 218. The emitter terminal of transistor 202 is connected by a conductor 220 to the base of an NPN transistor 222. The collectors of transistors 208 and 222 are connected together at a junction 224 which is also connected to one terminal of the drive motor 226. The collectors of transistors 212 and 218 are connected together at a junction 228 which is also connected to the other terminal of drive motor 226. The emitters of transistors 208 and 218 are connected together at a junction 230 which is also connected to the system source of positive potential. The enitters of transistors 212 and 222 are connected together at a junction 232 which is also connected to signal ground.

It can be seen that when transistor 200 is in a conductive state, then a current path is formed from the source of positive potential through junction 230, through the emitter base path of transistor 208 and through resistor 206, conductor 204, the collector emitter path of transistor 200, conductor 210, the base emitter path of transistor 212, and junction 232, to signal ground. This current flow causes transistors 208 and 212 to become conductive so that a larger current is caused to flow from the source of positive potential through junction 230, the base collector path of transistor 208, in a first direction from terminal 224 through motor 226 to terminal 228, the collector emitter path of transistor 212 and junction 232 to signal ground. The direction of current through motor 226 from left to right in FIG. 2 will cause the motor to drive the lens in a direction from "far" to "near" to achieve proper focus. When transistor 202 becomes conductive, then a current path is formed from the source of positive potential to junction 230, the emitter base path of transistor 218, resistor 216, conductor 214, the collector emitter path of transistor 202, conductor 220, the base emitter path of transistor 222 and junction 232 to signal ground. This current flow causes transistors 218 and 222 to become conductive, thereby providing a larger current flow from the source of positive potential through junction 230, the emitter collector path of transistor 218, and in a second direction from terminal 228 through motor 226 to terminal 224, the collector emitter path of transistor 222 and junction 232 to signal ground. The direction of current through motor 226 from right to left in FIG. 2 will cause the motor to drive the lens in the direction from "near" to "far" to achieve proper focus. For convenience, the work "near" has been placed above the output of NOR gate 190 in FIG. 2 to show that a "1" signal at this point will produce a drive from "far" to "near" and the word "far" has been placed above the output of NOR gate 192 to indicate that a "1" signal at this point will produce a drive from "near" to "far".

A source of reference potential for the system is shown in the lower middle portion of FIG. 1 comprising an NPN transistor 240 with its collector connected by a conductor 242 to the source of positive potential for the system. The emitter of transistor 240 is connected to a junction point 244 and through a resistor 246 to signal ground. The base of transistor 240 is connected by a conductor 248 to a junction point 250. A resistor 252 is connected between junction point 250 and the source of positive potential and a resistor 254 is connected between junction point 250 and signal ground. Transistor 240 is connected as an emitter follower and the circuit just described, with resistors 246, 252 and 254 properly chosen, causes a potential, $V_{REF}$ to appear at junction point 244 which is approximately half of the voltage of the sourcee of positive potential for the system. Junction point 244 is connected by a conductor 260 through a resistor 262, a junction point 263, and a resistor 264, labelled "$R_m$" to signal ground. The potential at junction point 263, $V_M$, will be somewhat below the reference voltage, $V_{REF}$, depending on the values chosen for resistors 262 and 264, and as will be explained later in greater detail, provides a signal into the system even when the lens or optical member being focused is in the correct position. This signal, in the form of a minimum drive pulse width, allows static friction of the lens or optical member being positioned to be overcome. If desired, resistor 204 may be made variable so as to provide for adjustment of the minimum pulse width.

The emitter of previously described NPN transistor 108 is connected by a conductor 266 to the conductor 260 and thus to the reference potential. The collector of transistor 108 is connected by a conductor 268 to a junction point 270. A capacitor 272 labelled "$C_F$", is connected between junction point 270 and signal ground and a resistor 274 labelled "$R_F$" is connected between junction point 270 and the source of positive potential for the system. The collector of transistor 108 is also connected by a conductor 276 to the positive input terminal of an amplifier 278. The output of amplifier 278 is connected by a conductor 280 to the emitter of the previously described transistor 156. The collector of transistor 156 is connected by a conductor 282 to the minus input terminal of amplifier 278. The collector of transistor 156 is also connected by a conductor 284 to a junction point 286. A capacitor 288 labelled "$C_N$" is connected between junction pont 286 and signal ground. The collector of transistor 156 is also connected by a conductor 290 to a junction point 292. The collector of previously described transistor 134 is connected by conductor 194 to junction point 292 and the emitter of transistor 134 is connected by a conductor 296 to the conductor 260 and thus to the source of reference potential. Junction point 292 is also connected by a conductor 298 to the minus input terminal of an amplifier 300.

Junction point 286 just above capacitor 288, $C_N$, is connected by a resistor 302 labelled "$R_N$" and a conductor 304 to the collector of a PNP transistor 306, the emitter of which is connected by a conductor 308 to the source of positive potential for the system. The base of transistor 306 is connected via a resistor 310 and a conductor 312 to the junction between previously described inverter 112 and NOR gate 116.

An amplifier 320 is shown in the lower right hand portion of FIG. 1 having its positive input terminal connected to the junction 263 between resistors 262 and 264 and thus will receive the potential $V_M$ thereon. The minus input terminal of amplifier 320 is connected by a conductor 322 to a junction point 323 and from junction pont 323 by a conductor 324 to the positive terminal of amplifier 300. The output of amplifier 320 is connected by a conductor 324 to the other inputs of previously described NOR gates 190 and 192.

The output of amplifier 300 is connected by a conductor 330 to one input of a NOR gate 332 and the output of NOR gate 332 is connected by a conductor 334 to the other input terminal of previously described NOR gate 94. The output of NOR gate 94 is connected by a conductor 336 to the other input of NOR gate 332 and by a conductor 338 to the other input of previously described NOR gate 92.

The output of NOR gate 92 is connected by a conductor 340 to the input of an inverter 342, the output of which is connected to a junction point 344. Junction point 344 is connected by a conductor 346 to the other inputs of previously described NOR gates 170 and 172 and is also connected by a conductor 348 and a resistor 350 to the base of a PNP transistor 352. The emitter of transistor 352 is connected through a resistor 354 to the source of positive potential for the system. The base of transistor 352 is connected by a conductor 356 to the collector of transistor 352 and to the base of a PNP transistor 358. The emitter of transistor 358 is connected through a resistor 360 to the source of positive potential for the system and the collector of transistor 358 is connected by a conductor 361 to the junction point 323 and from junction point 323 by a conductor 362 to a junction point 364. A capacitor 366 labelled "$C_D$" is connected between junction point 364 and signal ground and a resistor 368 labelled "$R_D$" is connected in parallel with capacitor 366 between junction 364 and signal ground. As connected, transistors 352 and 358 constitute another current "mirror" and operate to supply a constant current to capacitor 366, $C_D$.

OPERATION

Figure 3:
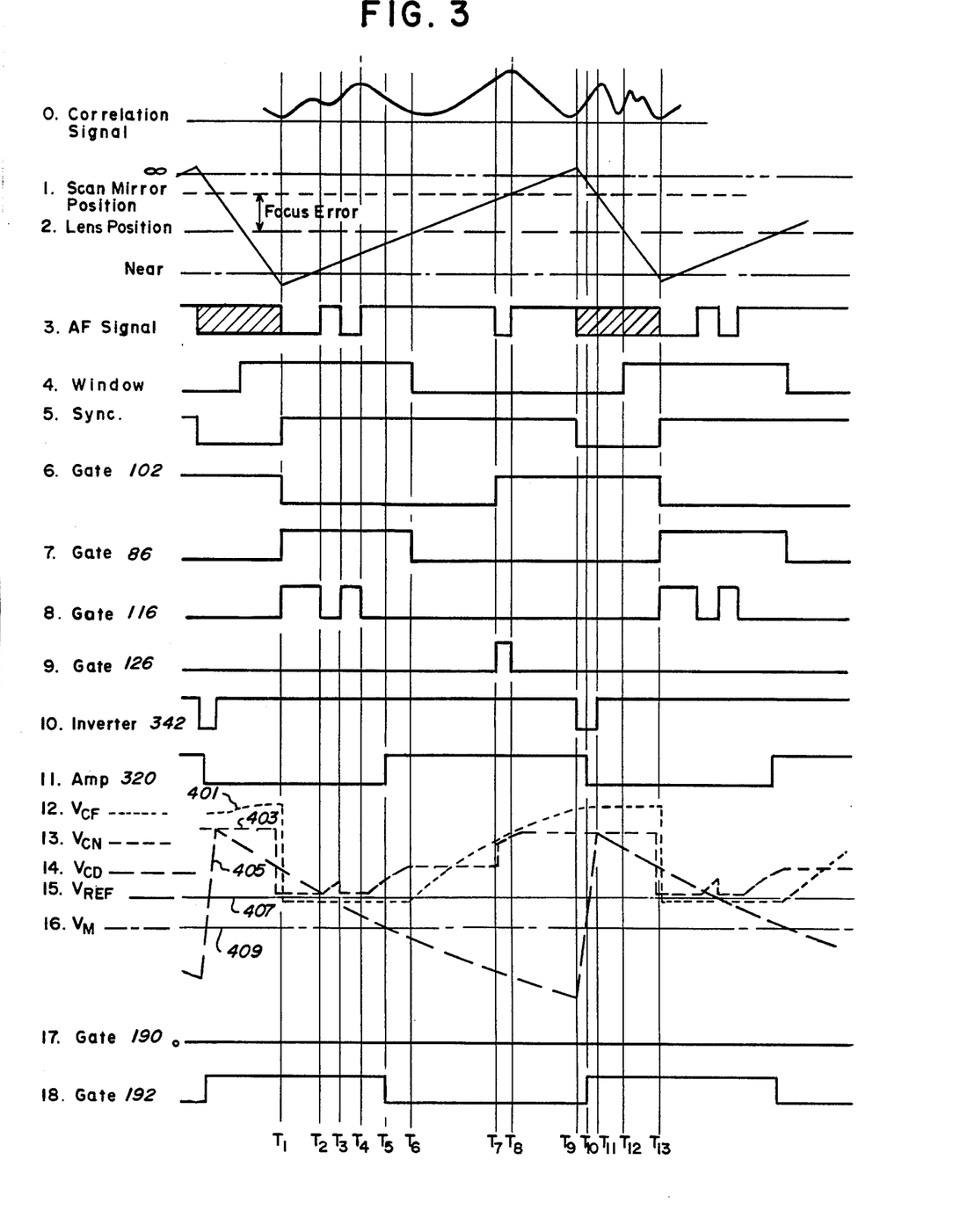
FIG. 3 shows the waveforms associated with the operation of the system of FIG. 2.

In considering the operation of the circuit of FIG. 2, reference should be had to FIG. 3, which shows a series of 19 graphs numbered 0 through 18 and vertically arranged so as to show the voltages and signals in the circuit of FIG. 2 at various times during a cycle. The vertical lines of FIG. 2 show 13 different time periods which have been chosen for the cycle at points where significant events occur.

Graph number 0 of FIG. 3 shows how the correlation signal, from a comparison of the radiation patterns entering the module 1 of FIG. 1 from mirrors 2 and 3, might vary during a scan. It is seen that a small correlation peak occurs at time $T_2$, another higher peak occurs at time $T_4$ and the final largest peak showing best correlation occurs at time $T_8$. At the end of the active scan at time $T_9$, the correlation peaks repeat in reversed order but are compressed by the fact that the return scan is at a higher rate than the active scan.

Graph number 1 of FIG. 3 is a solid saw-tooth line representative of the scan mirror position showing that the mirror travels from a position slightly closer than the nearest object expected to be focused upon at the "near" position to a position slightly beyond where it would be focused at the "far" position or infinity represented by "∞". Superimposed on the saw-tooth scan mirror position is Graph number 2, a long dashed line indicative of the position of the lens which is to be positioned by the motor. It is seen in FIG. 3 that the lens position is a little less than half way between the "near" and "far" or "∞" positions of the scan mirror.

Graph number 3 shows the variations presumed for the autofocus or "AF" signal. The AF signal, as explained in my above-mentioned copending application Ser. No. 804,111, changes from a "1" to a "0" each time the correlation circuitry detects that a peak in the correlation signal is approaching and which changes from a "0" to a "1" whenever the correlation circuitry determines that a new peak has been reached. In FIG. 3, it has been presumed that the correlation signal has three distinct peaks in the scan from near to far, the first occurring at time $T_2$, the second at time $T_4$, and the third at time $T_8$, and these are the times in Graph number 3 when the AF signal changes from "0" to "1". The AF signal then remains a "1" until the correlation signal rises to a value above the previous peak indicating that a new peak is approaching. In this manner, the last and highest peak is held at a "1" until the end of the active scan. It is seen that the first two peaks occur at times before the scan mirror has reached a position corresponding to the lens position, i.e., time $T_6$, and the last peak occurs when the scan mirror is at a position corresponding to about half way between the present lens position and the far or infinity position. The cross hatched portions of Graph number 3 show that it makes no difference to the circuit of FIG. 2 what the AF signal is.

Graph number 4 is representative of the signal produced by the "window" or relative position switch or with reference to FIG. 2, the signal which appears at terminal 10 and identified with the "W". It is seen that the window switch is a "1" at the beginning of the scan and traverses from "1" to "0" at Time $T_6$ when the scan mirror crosses a position corresponding to the present lens position.

Graph number 5 is representative of the signal produced by the sync switch or with reference to FIG. 2, the signal appearing on terminal 12 identified by an "S". It is seen that the sync switch becomes a "1" at the beginning of the scan when the mirror is in the slightly closer than "near" position position and becomes a "0" when the mirror has finished its scan at the slightly further than "∞" position.

Graph number 6 represents the output of NOR gate 102 in FIG. 2 and is seen to become a "0" at the start of the scan but changes to a "1" at time $T_7$, which corresponds to the time when the autofocus signal of Graph 3 last changes from a "1" to a "0" indicating that a peak is approaching.

Graph number 7 is representative of the output of NOR gate 86 of FIG. 2 and, as can be seen in FIG. 3, becomes a "1" at the beginning of the scan and becomes a "0" at time $T_6$, which represents the time when the scan mirror position corresponds to the lens position in the scan.

Graph number 8 represents the output of NOR gate 116 and it can be seen that this is a "1" at the beginning of the scan, becoming a "0" for the first time at time $T_2$, when the autofocus signal of Graph 3 first became a "1" indicating that a peak had been reached. The output of gate 116 thereafter changes to a "1" again at time $T_3$, which corresponds to the time when the autofocus signal of Graph 3 changes from a "1" to a "0", indicating that another peak is approaching. Finally, the output of NOR gate 116 changes from a "1" to a "0" at time $T_4$, which corresponds to the last time the autofocus signal of Graph 3 moves to a "1" position prior to "window" switch closure and indicating that another peak has been reached.

Graph number 9 shows the output of NOR gate 126 and, as can be seen in FIG. 3, this remains a "0" from the start of the scan until time $T_7$, when it changes to a "1". Time $T_7$ corresponds to the last shift from a "1" to a "0" in the autofocus signal of Graph 3 during the active scan. The output of gate 126 again shifts to a "0" at time $T_8$ indicative of the fact that the autofocus signal of Graph 3 has now moved to a "1", showing a new and, in this case, final, peak has been reached.

Graph number 10 indicates the output of inverter 342 of FIG. 2 and, as can be seen from FIG. 3, is a "1" from the beginning of the scan until time $T_9$, which corresponds to the closing of the sync switch of Graph 5 and is indicative of the end of the active scan of the mirror. The output of inverter 342 becomes a "1" again at time $T_{11}$, indicative of the fact that the voltage on capacitor 366, $V_{CD}$, has been charged to a value corresponding to the voltage on capacitor 288, $V_{CN}$, as will be explained in greater detail hereinafter.

Graph number 11 shows the output of amplifier 320 of FIG. 2 and, as can be seen from FIG. 3, is a "0" until it changes to a "1" at time $T_5$, representative of the fact that the voltage on capacitor 366, $V_{CD}$, has discharged to a value equal to the voltage across resistor 264, $V_M$, as will be explained in greater detail hereinafter. The output of amplifier 320 in Graph 11 then remains a "1" until it changes to a "0" at time $T_{10}$ representative of the fact that voltage on capacitor 366, $V_{CD}$, has been charged to a value slightly greater than the voltage across resistor 264, $V_M$, as will be explained in greater detail hereinafter.

Graphs 12, 13, 14, 15 and 16, represent voltages appearing at various points in the circuit of FIG. 2.

Graph number 12 is a small dashed line graph identified by a reference numeral 401 and is indicative of the voltage $V_{CF}$ across capacitor 272. $V_{CF}$ is seen in FIG. 3 to drop to the level of the reference voltage, $V_{REF}$ of Graph 15, at the beginning of the cycle and begins charging up with the closure of the window switch at time $T_6$.

Graph number 13 is a larger line graph identified by reference numeral 403 and represents the voltage on capacitor 288, $V_{CN}$. It is seen that $V_{CN}$ also drops to the reference voltage at the beginning of the cycle but begins charging up each time the autofocus signal goes from a "0" to a "1" prior to window switch closure and moves back down to the reference voltage whenever the autofocus signal goes from a "1" to a "0" prior to window switch closure. When the window switch closes at time $T_6$, the voltage on capacitor 288, $V_{CN}$, is held at its then value until such time as a new peak is seen to be approaching, i.e., at time $T_7$. At time $T_7$, $V_{CN}$, is changed to the voltage which then exists on capacitor 272, $V_{CF}$, and then charges along with this latter capacitor until time $T_8$, when the autofocus signal of Graph 3 indicates that, in this case, the final peak has been reached. The voltage $V_{CN}$ thereafter remains constant for the remainder of the cycle.

Graph number 14 is shown as largest dashed lines identified by reference numeral 405 and is representative of the voltage appearing on capacitor $366_D$. It is seen that this voltage has previously been brought to the level of $V_{CN}$ prior to the starting of the cycle and is discharging at the time the sync switch opens and the scan mirror begins to move. $V_{CD}$ continues discharging throughout the entire cycle achieving a voltage equal to that across resistor 264, $V_M$, at time $T_5$. At the end of the cycle, $T_9$, capacitor 366 is rapidly charged to the voltage $V_{CN}$ which exists on capacitor 288 for the beginning of the next cycle.

Graph number 15 is a straight line identified by reference numeral 407 and is indicative of the magnitude of the reference voltage $V_{REF}$ at junction point 244 in FIG. 2. This remains constant throughout the cycle.

Graph number 16 is a dash-dot line identified by reference numeral 409, $V_M$, and represents the magnitude of the voltage $V_M$ across resistor 264 in FIG. 2. As explained, this voltage is a little below the voltage appearing at junction point 244, $V_{REF}$, for purposes of providing a small signal to the motor even at a balanced focus condition.

Graph number 17 shows the output of NOR gate 190 of FIG. 1 and, as can be seen in FIG. 3, is a "0" throughout the entire cycle for the situation which has been chosen to be described herein.

Graph number 18 shows the output of NOR gate 192 of FIG. 2 and it is seen that this is a "1" from some time prior to the start of the scan until time $T_5$, when the voltage on capacitor 366, $V_{CD}$, reaches the voltage $V_M$ across resistor 264. The motor 226 of FIG. 2 drives in a direction towards infinity or from "near" to "far" whenever a "1" signal appears at the output of NOR gate 192 and would drive from "far" to "near" in the event of a "1" output from NOR gate 190. In the present case, however, there is no "1" output on gate 190 during the entire cycle so motor 226 of FIG. 1 is energized to drive towards infinity until time $T_5$ and thereafter is not energized until time $T_{10}$, at which time the output of NOR gate 192 is again a "1", representative of the fact that the voltage on capacitor 366, $V_{CD}$, has again achieved the level of the voltage $V_M$.

Using FIGS. 2 and 3, the operation of the circuit of FIG. 2 will be described in detail for the complete cycle shown. It is seen in FIG. 3 that at a time just prior to the start of the cycle at $T_1$, the autofocus signal is probably a "0", although its magnitude is irrelevant until the scan begins, the window switch has been opened so that a "1" signal exists at terminal 10, the sync switch has been closed so that a "0" signal exists at terminal 12, the output of gate 102 is a "1", the output of gate 86 is a "0", the output of gate 116 is a "0", the output of gate 126 is a "0", the output of inverter 342 is a "1", the output of amplifier 320 is a "0", the output of gate 190 is a "0", and the output of gate 192 is a "1", indicating that the motor is still driving from "near" towards "far" from the last cycle.

At time $T_1$, the autofocus signal appearing on terminal 14 of FIG. 1 is a "0" and this signal is presented to the upper input terminals of both NOR gates 116 and 126. The window switch is open so that a "1" signal exists on terminal 10 and this "1" signal is presented to the upper input terminal of NOR gate 22 and to the input terminal of inverter 24. The output of inverter 24 will thus be a "0" at time $T_1$. The sync switch opens at time $T_1$, thus producing a "1" signal at terminal 12, which signal is presented to the upper terminal of NOR gate 52 and to the input of inverter 54. A "0" signal therefore appears on line 60 at the output of inverter 54. The arrangement of signals in the crosscoupled flip-flops comprising inverters 24 and 54 and NOR gates 22, 28, 32, 36, 52, 58, 62 and 66, at time $T_1$, is as follows: the output of NOR gate 22 is a "0", the output of NOR gate 28 is a "1", the output of NOR gate 32 is a "0", the output of NOR gate 36 is a "0", the output of NOR gate 52 is a "0", the output of NOR gate 58 is a "1", the output of NOR gate 62 is a "1" and the output of NOR gate 66 is a "0". These signals cause the cross-coupled flip-flops to be in a stable condition with a first output on line 44 representative of the condition of the window switch being open and a second output on line 74 representative of the condition of the sync switch being open. Although the cross-coupled flip-flops are presently stable, a zero signal upon terminal 10, as occurs at time $T_6$ will switch the output on line 44 to a "1". Similarly, a "0" signal on terminal 12, as occurs at time $T_9$, will change the signal on line 74 to a "1". Furthermore, it is the very first closure of the window and sync switches which produces the pulse causing the flip-flop to operate so that any bouncing of the switch contacts that may occur thereafter will have no effect on the outputs at conductors 44 and 74, respectively.

Since conductors 44 and 74 both carry 37 0" signals, the output of NOR gate 86 is a "1". This "1" signal is presented as one input to NOR gate 102, to the input of inverter 112, and to the base of transistor 108, which is thereby turned to an "ON" condition. When transistor 108 is turned on, the reference voltage $V_{REF}$ which appears at terminal 244 will be presented through transistor 108 to the plus terminal of amplifier 278 and also to the capacitor 272, $C_F$, thereby making $V_{CF}$ equal to the reference voltage, as is seen by dotted line 401 in Graph 12 of FIG. 2.

Since the output of NOR gate 28 is a "1" and the signal on line 74 is a "0", the inputs to NOR gate 82 are a "1" and a "0", respectively, thereby producing a "0" signal at the output on conductor 120. This signal operating through inverter 122 places a "1" signal on line 124, which forms the lower input signal for NOR gate 126.

As mentioned, the input to inverter 112 is a "1" at time $T_1$ and, accordingly, the output thereof on line 114 is a "0". Since at time $T_1$, the autofocus signal on terminal 14 is a "0", the inputs to NOR gate 126 are a "0" and a "1", respectively, while the inputs to NOR gate 116 are a pair of "0"'s. The output of NOR gate 126 on conductor 136 will therefore be a "0" and this signal is presented to the lower input terminal of NOR gate 138 and through conductor 142 to the base of transistor 144, thereby causing this transistor to be in an "OFF" condition. The output of NOR gate 116 is a "1" which signal is presented through resistor 132 to the base of transistor 134, thereby turning this transistor to an "ON" condition. Whenever transistor 134 is turned on, the reference voltage $V_{REF}$ on terminal 244 will be conducted through transistor 134 to junction point 292 and will thereby form the input signal to the minus terminal of amplifier 300, via conductors 290 and 284 to capacitor 288 thereby making $V_{CN}$ equal to $V_{REF}$, as seen in Graph 13 of FIG. 3, and also through conductors 290 and 282 to the minus terminal of amplifier 278. It should be noted, however, that since transistor 144 above is turned off at time $T_1$, the current mirror formed by transistors 148 and 152 produce no current to the base of transistor 156 and, accordingly, this transistor is turned off. It therefore makes no difference what the output of amplifier 278 might be since it is not connected to the rest of the circuit. It should also be noticed that at such time as transistor 156 becomes conductive, then amplifier 278 is connected to operate as a voltage follower and the voltage appearing on the positive terminal of amplifier 278 will be the output signal on line 280, which signal will be conducted and, through transistor 156, to the minus input terminal of amplifier 300. Transistor 134 will always be turned off when transistor 156 is turned on. Actually, this only occurs during a short period of time between $T_7$ and $T_8$, as will be explained.

It should also be noticed that the "0" output from inverter 112 is presented by a conductor 312 and resistor 310 to the base of transistor 306, thereby turning this transistor to an "ON" condition. When transistor 306 is on, the positive signal from the system source is conducted through transistor 306 to one side of resistor 302. Junction point 286 is, however, tied to the reference voltage by virtue of the fact that transistor 134 is on, as explained above.

As was indicated above, the output of NOR gate 86 on conductor 100 is a "1" at time $T_1$ and, accordingly, regardless of the other input to NOR gate 102, the output of NOR gate 102 must be a "0". This "0" signal appears on conductor 164 as one of the inputs to NOR gate 170 and appears through conductor 166 as the other of the inputs to NOR gate 138. Since, as previously mentioned, the output of NOR gate 126 on conductor 136 is, at time $T_1$, a "0", NOR gate 138 has a pair of "0" signals as its inputs and thereby has a "1" output signal appearing on conductor 160 which is presented both to the upper terminal of NOR gate 172 and to the lower terminal of NOR gate 102. The output signals on conductors 164 and 160 are indicative of the direction which the motor must turn in order to bring the lens or primary optical element into the correct focus position. More specifically, as will be seen, until the time of operation of the window switch, the output of NOR gate 102 will continue to be a "0" while the output of NOR gate 138 will continue to be a "1". This condition will also exist after the time of window switch closure if there are no further transitions of the signal on the autofocus input terminal 14 indicative of a peak occurring after window switch closure. Thus, if there are no further autofocus signals after window switch closure, the "0" signal on line 164 and the "1" signal on line 160 will operate to cause the motor to drive the lens towards the near position. On the other hand, if an autofocus signal occurs after window switch closure on line 14 as occurs in the present example at time $T_7$, the output of NOR gate 102 on conductor 164 will become a "1" and the output of NOR gate 138 on conductor 160 will become a "0". Then when the motor is caused to drive, it will drive in a direction to move the lens or other primary optical element towards the "far" or infinity position.

It is seen from Graph 14 that the voltage on capacitor 366, $V_{CD}$, still is at a higher level at time $T_1$ than the reference voltage $V_{REF}$ of Graph 15. Because of this, the voltage on the positive terminal of amplifier 300 via conductor 362 will be higher than the voltage on the negative terminal of amplifier 300 via conductors 260, 296, transistor 134 and conductor 298. Amplifier 300 is a voltage comparator and whenever the signal on the positive input terminal is greater than the signal on the negative input terminal, a hard positive or "1" signal will appear at its output on conductor 330. On the other hand, should the voltage on the negative terminal of amplifier 300 exceed the voltage on the positive terminal, then the output on conductor 330 will be a large negative or "0" signal. At time $T_1$, however, with the voltage on the capacitor 366 being larger than the reference voltage, the output of amplifier 300 on conductor 330 will be a "1".

Moving back over to the left hand portion of the drawing, it was previously indicated that the output of NOR gate 58 at time $T_1$ was a "1" and this signal is presented by conductors 72 and 90 to the upper input of both NOR gate 92 and NOR gate 94. With a "1" input to NOR gate 94, its output on conductor 338 will be a "0", which signal is presented to the lower input of NOR gate 92 and to the upper input of NOR gate 332. NOR gate 332 therefor has a "0" and a "1" as its inputs, thereby producing a "0" output on conductor 334, which is presented to the lower input terminal of NOR gate 94.

With NOR gate 92 having a "1" and a "0" as its inputs, the output thereof on conductor 340 will be a "0" which is presented to inverter 342, causing its output at terminal 344 to be a "1". This "1" signal on terminal 344 is presented by a conductor 346 to the lower inputs of NOR gates 170 and 172, respectively, and via conductor 348 and resistor 350 to the base terminals of transistors 352 and 358, both of which are thereby placed in an "OFF" condition. Accordingly, the current mirror formed by transistors 352 and 358 does not produce an output and capacitor 366, $C_D$, will not be changed from the plus voltage source but rather will continue to drain through resistor 368, $R_D$.

As previously mentioned, the output of NOR gate 102 is a "0" at time $T_1$, while the output of NOR gate 138 on conductor 160 is a "1". As also previously mentioned, the signal on conductor 346 is a "1" at time $T_1$ and, therefore, the NOR gate 170 has a "0" and a "1" as input signals, causing its output on conductor 174 to be a "0". Likewise, NOR gate 172 having a pair of "1" signals as its input, produces a "0" output on conductor 176. These two "0" signals are presented to a flip-flop composed of NOR gates 178 and 180. The output of NOR gate 178 is a "1" at time $T_1$, while the output of NOR gate 180 is a "0" at this time. This then readies the flip-flop for a change of state should the output of NOR gate 170 ever change from a "0" to a "1" which in the example chosen does not occur. Thus, the output of NOR gate 178 on line 182 is continuously a "1" which forms the input to NOR gate 190 and with a "1" as one of its inputs, the output on line 194 from NOR gate 190 is continuously a "0" which causes transistor 200 to be in an "OFF" condition. As long as transistor 200 is turned off, the motor 226 will not turn in a direction from "far" to "near" as will be further explained hereinafter. Meanwhile, the "0" output from NOR gate 180 forms the upper input to NOR gate 192. Thus, whenever the other input to NOR gate 192 coming from amplifier 320 via conductor 324 is a "0", the output of NOR gate 192 will be a "1" on line 196, thereby turning transistor 202 to an "ON" condition. The output of amplifier 320 will be a "0" whenever the signal on its negative terminal is greater than the signal on its positive terminal. As mentioned previously, the signal on the positive terminal of amplifier 320 is the fixed voltage $V_M$, which is set by the values of resistors 262 and 264 somewhat lower than the reference voltage. It can also be seen that the voltage on the negative terminal of amplifier 320 is derived from the voltage, $V_{CD}$, on capacitor 366 which, as seen in Graph 14 of FIG. 3, is considerably higher than the voltage on the plus terminal, $V_M$, of Graph 16. Accordingly, until such time as capacitor 366 has discharged through resistor 368 to a value slightly below that of $V_M$ across resistor 264, the output on conductor 324 will be a "0" and transistor 202 will continue to be turned on.

When transistor 202 is turned on, a circuit is created from the source of positive potential through junction 230, the emitter base junction of transistor 218, resistor 216, conductor 214, the collector emitter junction of transistor 202, conductor 220, the base emitter junction of transistor 222 and junction 232 to signal ground. This causes transistors 218 and 222 to be in a conducting state and a signal is therefore applied from the positive source of potential through junction 230, the emitter collector junction of transistor 218, through motor 226 from junction 228 to junction 224, through the collector emitter junction of transistor 222 and junction 232 to signal ground. The direction of current flow from junction 228 through motor 226 to junction 224 is such as to cause motor 226 to move the lens towards the "far" or infinity position. Although it does not occur in the present example, should the desired focus position be more towards the near position, transistor 202 would be turned off and transistor 200 would be turned on, thereby setting up a circuit similar to that described above but wherein the signal flowing through motor 226 would be from junction point 224 to junction point 228. Under these circumstances, the motor would turn in the opposite direction toward the "near" end of its range.

All of the above represents the situation as it occurred at time $T_1$ and in the discussion to follow at times $T_2$ through $T_{13}$ only the significant changes that occur in the circuit will be discussed.

At time $T_2$, the only change that occurs is that the autofocus signal appearing on junction 14 changes from a "0" to a "1", thereby placing a "1" signal on the upper inputs of NOR gates 116 and 126, respectively. Since the lower input of NOR gate 126 previously had a "1" signal thereon, the output of NOR gate 126 will not change but since the previous inputs to NOR gate 116 were both "0"'s, the output appearing on conductor 130 will change from a "1" to a "0". This has the effect of turning transistor 134 to an "OFF" condition. When transistor 134 is off, capacitor 228, $C_N$, which was previously tied to the reference voltage through transistor 134, can now begin charging from the positive source voltage through transistor 306 and resistor 302, $R_N$. This is seen in FIG. 3 as the rising of voltage of the dashed line 403 starting at time $T_2$ and going toward time $T_3$.

The negative terminal of amplifier 300 is likewise no longer tied to the referencce voltage but now has, as an input, the voltage $V_{CN}$ which exists on capacitor 288 which, as mentioned, is beginning to rise. The voltage on capacitor $C_D$, which forms the signal at the positive input terminal of amplifier 300, is seen to be falling to a level where it crosses the voltage rising on capacitor 288, $C_N$, sometime during the period between $T_2$ and $T_3$. When it does so, the output of amplifier 300 will then change to a "0", since the signal at the negative terminal will exceed the signal at the positive terminal. While a "0" signal on conductor 330 causes NOR gate 332 to produce a "1" output, this has no effect on the output of NOR gate 94, since the signal on conductor 96 is still a "1". Thus, the input to NOR gate 92 does not change between times $T_2$ and $T_3$.

At time $T_3$, the only change which occurs is that the autofocus signal again goes from a "1" to a "0", and thus the upper inputs of NOR gates 116 and 126 are again receiving "0" signals as was the case at time $T_1$. Thus, at time $T_3$, the only change occurring is that the output of NOR gate 116 changes back to a "1", thereby turning transistor 134 on and, again, dropping the voltage on capacitor 288, $C_N$, back to the reference potential, as can be seen by the dashed line 403 dropping back to $V_{REF}$ at time $T_3$ in FIG. 3. Also, when transistor 134 becomes conducting again, the negative input terminal of amplifier 300 again becomes that of the reference voltage and since, by this time, the voltage $V_{CD}$ on capacitor 366 has fallen below the voltage $V_{REF}$, the signal at the negative input terminal of amplifier 300 continues to be greater than the signal at the positive input terminal thereof, so that the output of amplifier 300 continues to be a "0" and no change occurs in the circuitry thereafter.

At time $T_4$, the only change occurring is that the autofocus signal appearing on terminal 14 again goes from a "0" to a "1", indicating that another peak in the correlation signal has been reached. As was the case at time $T_2$, this causes a "1" signal to appear on the upper inputs of NOR gates 116 and 126, the only effect of which is to change the output of NOR gate 116 appearing on conductor 130 so as to turn transistor 134 off. Again, as was the case at time $T_2$, this permits capacitor 288, $C_N$, to begin charging up from the voltage $V_{REF}$ via conductor 308, transistor 306, conductor 304 and resistor 302, $R_N$. This is also shown in FIG. 3 as the rise which occurs in the dashed line 403 from time $T_4$ onward to time $T_6$.

Likewise, as was the case at time $T_2$, the voltage appearing on the negative terminal of amplifier 300 is no longer tied to the reference voltage but rather now increases with the voltage, $V_{CN}$, appearing on capacitor 288. By this time, however, the voltage, $V_{CD}$, on capacitor 366, is considerably below $V_{REF}$, and the signal at the negative terminal of amplifier 300 continues to be predominant, so that the output appearing on conductor 330 continues to be a "0" and no further change occurs.

At time $T_5$, the main event is that the voltage $V_{CD}$ on capacitor 366 falls to a level where it is just below the voltage $V_M$ across resistor 264. This is seen in FIG. 3 where the voltage $V_{CD}$ which is shown on curve 405 in Graph 14 falls just below voltage $V_M$ shown as dot-dash line 409 in Graph 16. When this occurs, the input voltage appearing on the positive terminal of amplifier 320 begins to exceed the voltage appearing on the negative terminal, with the result that the output of amplifier 320 switches from a "0" to a "1". This results in a "1" being presented to the lower inputs of both NOR gate 190 and NOR gate 192. Since the upper input of NOR gate 190 was already receiving a "1" signal, there is no change in output of NOR gate 190 but since the upper input of NOR gate 192 is receiving a "0" signal, the output of NOR gate 192 now changes from a "1" to a "0", which has the effect of turning transistor 202 off and causing the motor 226 to stop being energized. As was brought out in the above-mentioned copending application, Ser. No. 804,111, motor 226 drives at a rate which is proportional to the pulse width of the input signal. The pulse width driving motor 226 is equal to the length of time NOR gate 192 has a "1" signal. This time as seen from FIG. 3 in Graph 18 extends from a period somewhat before time $T_1$ until time $T_5$ and will vary with the amount of charge on capacitor 366, $C_D$, and the rate of decay thereof through resistor 368, $R_D$. This decay rate can be set by the choice of magnitudes for capacitor 366 and resistors 368 but, as will be seen hereinafter, the charge will vary with, in the present example, the time between the window signal transition from "1" to "0" and the last autofocus "0" to "1" transition. Actually, the voltage $V_{CN}$ on capacitor 288 is that which varies directly with the time between window switch closing and autofocus transition from "0" to "1" but as will be described, the voltage on capacitor 288 is transferred to capacitor 366 after the end of the scan. At any rate as the magnitude of this voltage decreases, the speed of rotation of motor 226 will correspondingly decrease, thus producing the proportional drive which was described in the above-mentioned copending application, Ser. No. 804,111.

It is also seen that the motor drives during both the active and the return portions of the scan and that if there is a large error, the voltage $V_{CD}$ on capacitor 366 may be high enough or the decay rate low enough that the motor will operate continuously during both portions of the scan.

At time $T_6$, the window switch closes causing a transition of the voltage at terminal 10 to go from a "1" to a "0". Even though the mechanical structure of the window switch may be such as to cause several bounces of the contacts and thus a series of "1" to "0" transitions and back, it is only the first impulse that has any effect on the cross-coupled flip-flop arrangement above-described. More specifically, as soon as terminal 10 receives a first "0" signal, it is presented to the upper input of NOR gate 22 whose lower input was already receiving a "0" signal. Thus, upon the first occurrence of a window switch "0" signal, the output of NOR gate 22 changes from a "0" to a "1". Since the lower input of NOR gate 28 is receiving a "0" signal at this time, the "0" output from NOR gate 22 causes NOR gate 28 to switch to a "0". This "0" signal is presented to the upper input of NOR gate 36 and to the lower input of NOR gate 52. However, since the upper input of NOR gate 52 is already receiving a "1" from sync switch terminal 12, its output will remain unchanged as a "0". However, since the output of NOR gate 32 on conductor 34 is a "0", the changed output of NOR gate 28 produces a pair of "0" signals as inputs to NOR gate 36 and thereby changes its output from a "0" to a "1". This changes the signal on conductor 44, which through conductor 84 forms the upper input signal to NOR gate 86. It also changes the signal to the lower input terminal of NOR gate 62 which, since it is still receiving a "0" signal from inverter 54 as its upper input, changes the output on conductor 64 from a "1" to a "0". This signal is presented to the lower input of NOR gate 66 but since the upper input of this NOR gate was previously receiving a "1", there is no change in the output of NOR gate 66 and thus the signal on conductor 74 remains a "0" and the lower inputs to NOR gate 82 and NOR gate 86 continue to be "0". Likewise, the unchanged "0" signal from NOR gate 66 is presented to the lower input of NOR gate 58, which, since it is still receiving a "0" signal from the output of NOR gate 52 as its upper input signal, continues to produce a "1" output on conductor 72 which via conductor 76 continues to produce a "1" signal on the lower input terminal of NOR gate 32 and via conductor 90 on the upper inputs of NOR gates 92 and 94. Thus, the outputs from NOR gates 32, 92 and 94, will remain unchanged at time $T_6$. The cross-coupled flip-flop arrangement is now stable but is set so that upon the occurrence of a "0" signal from the closure of the sync switch through terminal 12, it will operate to produce a "1" signal on conductor 74 in place of the "0" signal being presented to the lower input terminals of NOR gates 82 and 86. Since the inputs of NOR gate 86 are now a "1" and a "0", the output on conductor 100 will change from a "1" to a "0". This signal is presented to the upper input of NOR gate 102 but since the lower input of this NOR gate is a "1" from the output of NOR gate 138, there is no change in output of NOR gate 102 and the signal on conductor 164 remains a "0". The change to a "0" signal on conductor 100 changes the input of inverter 112 so that its output now becomes a "1" but this produces no effect on NOR gate 116 since at time $T_6$, the autofocus signal at terminal 14 remains a "1". The change to a "1" from inverter 112 does not have the effect, however, of changing the input to the base of transistor 306 causing this transistor to return to an "OFF" condition. When this occurs, the path from the positive source of potential through transistor 306 and resistor 302, $R_N$, is opened and capacitor 288, $C_N$, stops charging and holds the last value it had attained. This is seen in FIG. 3 by the dashed line 403 which had been rising since time $T_4$ to time $T_6$, levelling off and holding horizontal between times $T_6$ and $T_7$.

The change in output of NOR gate 86 on conductor 100 from a "1" to a "0" also has the effect of changing the signal to the base of transistor 108, causing it to change to an "OFF" condition. With transistor 108 off, the upper terminal of capacitor 272, $C_F$, is no longer tied to the reference voltage $V_{REF}$ and consequently capacitor $C_F$ begins charging from the source of positive potential through resistor 274, $R_F$. This is seen in FIG. 3 by dotted line 401 representing $V_{CF}$ rising from time $T_6$ through the rest of the scan or until it equals the system potential.

The turning off of transistor 108 also has the effect of changing the signal applied to the positive input terminal of amplifier 278 but since its output is connected to the emitter of transistor 156 which continues to be in an "OFF" condition, the change has no effect. The output of amplifiers 300 and 320 remain the same as they were in "0" and "1" conditions, respectively, and, accordingly, there is no change in the motor's unenergized condition.

The change in output signal of NOR gate 28 on conductor 42 from a "1" to a "0" has one additional effect. The signal is presented to the upper input of NOR gate 82, which is still receiving at its lower input terminal a "0" signal from conductor 74 and thus the output of NOR gate 82 changes from a "0" to a "1" and this signal is presented to the inverter 122 whose output correspondingly changes from a "1" to a "0" and thus provides a change to the lower input of NOR gate 126. However, since the upper input of NOR gate 126 is still receiving a "1" signal from the autofocus terminal 14, there is no change in the output of NOR gate 126 and the signal on conductor 136 remains a "0".

It is seen that the major effective change that has occurred at time $T_6$, upon the closing of the window switch, is that capacitor 288, $C_N$, stops charging and holds its last value, while capacitor 272, $C_F$, begins charging from $V_{REF}$ towards the supplying voltage. The effect of this will become apparent in further descriptions.

At time $T_7$, the autofocus signal on terminal 14 changes from a "1" to a "0". This changes the signal to the upper inputs of NOR gates 116 and 126, but since the lower input of NOR gate 116 continues to receive a "1" signal from the output of inverter 112, there is no change in the output of NOR gate 116 and the signal on conductor 130 remains a "0". The signal on the lower input of NOR gate 126, however, is a "0" so that the change of autofocus signal on terminal 14 causes the output of NOR gate 126 to change from a "0" to a "1". The "1" signal on conductor 136 is presented to the lower input of NOR gate 138 but since the upper input of NOR gate 138 continues to receive a "1" from the output of NOR gate 102, there is no change in output of NOR gate 138 and the signal on conductor 160 remains a "0". The change in signal to a "1" on conductor 136 is presented by a conductor 140 and resistor 142 to the base of transistor 144 and transistor 144 now turns on. When transistor 144 turns on, an emitter base current is established from the source of positive potential through resistor 154 and the emitter base junction of transistor 148, through resistor 146 and transistor 144 to signal ground. A proportional current is conducted from the source of positive potential through resistor 156 and the emitter base junction of transistor 152, conductor 150, resistor 146 and transistor 144 to signal ground. Thus transistors 152 and 148 become conductive and operate as a current mirror producing a fixed current from transistor 148 through conductor 154 to the base of transistor 156, thereby turning transistor 156 on. When transistor 156 is turned on, amplifier 278 is allowed to operate as a voltage follower and the signal which appears on the positive input terminal of this amplifier likewise appears at the output on conductor 280 and through transistor 156, conductors 290 and 298 to the negative input terminal of amplifier 300. The signal which appears on the positive terminal of amplifier 278 is the voltage $V_{CF}$ on the capacitor 272, since transistor 108 remains off. Thus, the voltage $V_{CF}$ on capacitor 272 is now transferred to the minus input of amplifier 300, since transistor 134 remains off but this does not change the output of amplifier 300 since the voltage $V_{CN}$ on capacitor 366 remains lower than the signal $V_{CF}$ on the negative input terminal of amplifier 300. Thus, the signal on conductor 330 remains a "0" and no change in the circuitry above that point occurs. The voltage $V_{CF}$ on capacitor 272 which now appears at the output of amplifier 278, is also presented via conductor 284 to the upper terminal of capacitor 288, $C_N$. Recalling that capacitor 288 was previously holding the voltage it had attained at time $T_6$, it is seen that its voltage now rises to the level of the output of amplifier 278 or, in other words, to the level of the voltage $V_{CF}$ of capacitor 272. This is seen in FIG. 3 as a rise of the dashed line 403 representing $V_{CN}$ from its horizontal holding position substantially vertically to the value of the dotted line 401. $V_{CN}$ continues to follow $V_{CF}$ between times $T_7$ and $T_8$. Thus, the voltage $V_{CN}$ on capacitor 288 is now of magnitude indicative of the time from window switch closure, $T_6$, to time $T_7$ and, later, time $T_8$.

At time $T_8$, a signal at terminal 14 from the autofocus circuitry changes from a "0" to a "1" and thus the signal to the upper inputs of NOR gates 116 and 126 become "1"'s. This has no effect on the output of NOR gate 116 since its lower input was already receiving a "1" signal from inverter 112 but the output of NOR gate 126, which was previously receiving two "0" signals will now change from a "1" to a "0". Thus the signal on conductor 136 becomes a "0", which has no effect on the output of NOR gate 138 but which, operating through conductor 140 and resistor 142, changes the signal to the base of transistor 144, thereby shutting it off. When transistor 144 turns off, transistors 148 and 152 also turn off changing the signal to the base of transistor 156 which now also turns off. When transistor 156 turns off, the voltage $V_{CN}$ on capacitor 288 has no place to go since transistor 306 remains off and, accordingly, this voltage is held at its last value. This is seen in FIG. 3 as a levelling off of the dashed line 403 representing $V_{CM}$ at time $T_8$.

It should be noted that time $T_8$ represents the last time the autofocus signal changes from a "0" to a "1" and this transition is representative of the last or major peak in the correlation signal and thus of the position of proper focus. It can be seen in Graphs 1 and 2 of FIG. 3 that the time between the closing of the window switch at $T_6$ until the time when the major correlation peak is encountered is representative of the focus error. It is also seen that the voltage $V_{CN}$ on capacitor 288 is being held at the voltage which capacitor 272, $C_F$, had achieved at time $T_8$ and is thus indicative of the magnitude of the time between $T_6$ and $T_8$ or, in other words, indicative of the focus error. Thus, it is the voltage $V_{CN}$ on capacitor 288 that will tell the system the magnitude of the focus error so that motor 226 can drive the lens or primary optical object toward correct focus position.

At time $T_9$, the scanning mirror has completed its scan from near to far and the sync switch closes producing a "0" signal at terminal 12 of FIG. 2.

As mentioned above, the closing of the mechanical sync switch may produce bouncing but with the cross-coupling flip-flops of FIG. 2, it is only the first closing that causes an output change. This is important in the present circuit since, as seen in the description so far, the times between the closing of switches and the achieving of autofocus signals is representative of the focus error and this is quite critical. If the window or sync switch bouncing were not compensated then the timing would be in possible error, with the resultant error in the focusing of the lens.

The first touching of the sync switch contacts produces a "0" signal at the upper input of NOR gate 52, which now is receiving two "0" input signals so that its output changes to a "1" on conductor 56. This presents a "1" signal to the upper input of NOR gate 58, which had previously been receiving two "0" input signals and, accordingly, the output of NOR gate 58 will change from a "1" to a "0" on conductor 72. This signal is fed by conductor 70 to the upper input of NOR gate 66, and by conductor 72 to conductor 90 and thus to the lower input of NOR gate 32 and to the upper inputs of NOR gates 92 and 94.

The "0" signal now appearing at terminal 12 is also presented to inverter 54 so that its output changes to a "1" on conductor 60. The output of NOR gate 62 does not change, however, since its lower input had previously been a "1" and, accordingly, the output on conductor 64 remains a "0". NOR gate 66 is, however, now receiving two "0" input signals so its output changes to a "1" on conductor 74 and this signal is fed to the lower input of NOR gate 58 and to the lower inputs of NOR gates 22, 82 and 86. The output of NOR gate 86 will not change since it was previously receiving a "1" signal at its upper input and, accordingly, the signal on conductor 100 will remain a "0". The output of NOR gate 22, which was previously receiving two "0" input signals, will now change from a "1" to a "0", but this signal will have no effect on NOR gate 28, since it has been receiving a "1" signal at its lower input terminal. Thus, the signal on conductor 80 to the upper input of NOR gate 82 will remain a "0". Since the inputs to NOR gate 82 have changed from two "0" signals to a "0" and a "1", the output of NOR gate 82 will change from a "1" to a "0" and the output of inverter 122 on conductor 124 will change from a "0" to a "1", as the lower input to NOR gate 126. The output of NOR gate 126 will not change, however, since the autofocus signal at its upper input terminal remains a "1".

The major change which occurs by the closing of the sync switch is the change on the upper input terminal of NOR gate 92 from a "1" to a "0". NOR gate 92 is now receiving two "0" signals and, accordingly, its output changes from a "0" to a "1", which when inverted by inverter 342 places a "0" signal at terminal 344 and via conductor 346 to the lower inputs of NOR gates 170 and 172. The output of NOR gate 170 will now change, however, since it is still receiving a "1" signal at its upper input but the output of NOR gate 172 will now change since it is now receiving two "0" input signals. Thus, the signal on conductor 176 changes from a "0" to a "1". This has no effect on the output of NOR gate 180, however, since the upper input terminal of this NOR gate is still receiving a "1". As a result at time $T_9$, the outputs of NOR gates 190 and 192 do not change and the motor continues to be in an unenergized condition.

The "0" output from inverter 342 appearing on terminal 344 is presented by a conductor 348 and resistor 350 to the base terminals of transistors 352 and 358. This causes these transistors to turn on and a current path is established from the positive source of potential through resistor 360, the emitter collector junction of transistor 358 via conductors 361 and 362 to the upper terminal of capacitor 366, $C_D$. As previously mentioned, transistors 352 and 358 operate as a current mirror and the current flowing from collector of transistor 358 will be constant regardless of voltage changes, thus rapidly charging capacitor 366, $C_D$, up towards the supply potential. This is seen in FIG. 3 as the very rapid rise occurring in the voltage $V_{CD}$ on large-dashed line 405 between times $T_9$ and $T_{11}$. The effect of charging capacitor 366, $C_D$, will be to present a large signal at the positive terminal of amplifier 300 and at the negative terminal of amplifier 320, as will be seen.

At time $T_{10}$, the voltage $V_{CD}$ on capacitor 366 has risen to a point where it crosses the dot-dash line 409 representative of the voltage $V_M$. When this occurs, the voltage at the negative terminal of amplifier 320 equals and just exceeds the voltage at the positive terminal of amplifier 320 with the result that the output of amplifier 320 changes from a "1" to a "0" at time $T_{10}$. This signal is presented to the lower inputs of NOR gates 190 and 192 and, while it has no effect on the output of NOR gate 190 since the upper input of this NOR gate remains a "1", the output of NOR gate 192 will change from a "0" to a "1" by virtue of the fact that it now has two "0" signals as its inputs. Conductor 196, now carrying a "1" signal turns transistor 202 on and, as previously explained, causes motor 226 to drive in a direction from "near" to "far" or, in other words, towards the desired focus position.

At time $T_{11}$, the voltage $V_{CD}$ on capacitor 366 has risen to the point where it now equals the voltage being held on capacitor $C_N$ as is represented by the dashed line 403 of Graph 13 in FIG. 3. When this occurs, the voltage appearing on the positive terminal of amplifier 300 equals and just exceeds the voltage appearing on the negative terminal of this amplifier and, accordingly, the output of amplifier 300 changes from a "0" to a "1". This signal is presented by a conductor 330 to the lower input of NOR gate 332 and since the upper input of this NOR gate has been receiving a "0" signal, the output of NOR gate 332 switches from a "1" signal to a "0" signal. As soon as a "0" signal appears on conductor 334, NOR gate 94 will have two "0" output signals and its output appearing on conductor 338 will change from a "0" to a "1". At this time, since the two inputs to NOR gate 92 have both been "0"'s, the change to a "1" at the lower input will cause the output of NOR gate 92 appearing on conductor 340 changes from a "1" to a "0" and, correspondingly, the output of inverter 342 appearing on junction point 344 changes from a "0" to a "1". This "1" signal at junction 344 is presented to the lower inputs of NOR gates 170 and 172 but the output of NOR gate 170 does not change since it has previously been receiving a "1" signal on its upper input. The output of NOR gate 172 which was previously receiving two "0" input signals now changes from a "1" to a "0" on conductor 176 but this has no effect on the output of NOR gate 180 since it had previously been receiving a "1" signal on its upper input. Accordingly, there is no change in the output of NOR gates 190 and 192 and motor 226 continues to turn in the direction from "near" to "far, as desired.

The change in the output signal from inverter 342 from a "0" to a "1" is presented by a conductor 348 and resistor 350 to the base of transistors 352 and 358, thereby turning them into an "OFF" condition. This prevents further charging of capacitor 366, $C_D$, and this capacitor now assumes a voltage which it last held, i.e., the voltage $V_{CN}$ that was on capacitor 288. This is seen in FIG. 3 as the junction point of the large dashed line 405 representing $V_{CD}$ and medium dashed line 403 representing $V_{CN}$. Capacitor 272, $C_F$, has continued charging continuously from the time it started but since transistor 156 has been off since time $T_8$, this voltage has had no effect.

The voltage $V_{CD}$ on capacitor 366 now begins discharging through resistor 368, $R_D$, and will do so approximately along a line shown by the first portion of large dashed line 405 between the times before time $T_1$ and time $T_9$ during the next cycle. However, each successive time the motor drives the primary lens towards a better focus position, the focus error decreases and the magnitude of the voltage on the capacitors will decrease until the desired focus position is reached. Even at this time, however, there will be a small voltage difference between the inputs to the amplifier 320 by virtue of the fact that even though the voltage $V_{CD}$ on capacitor 366 may approximately equal the reference voltage when there is no error, there will be a voltage between the two inputs of amplifier 320 due to the voltage drop from $V_{REF}$ to $V_M$ that occurs between resistors 262 and 264. The "0" output from amplifier 320 which results will then operate to produce an output "1" signal from either NOR gate 190 or 192, depending upon the direction that the focus is in error, and will thus turn on either transistor 200 or 202 so that motor 226 will be energized even though the pulse width may be very small. This has the advantage of overcoming the static friction of the servo system.

As soon as capacitor 366, $C_D$, starts discharging through resistor 368, $R_D$, the voltage at the positive terminal of amplifier 300 falls below the voltage at the negative terminal of this amplifier since the voltage $V_{CN}$ on capacitor 288 is being held until the sync switch closes again. As a result, the output of amplifier 300 changes from a "1" to a "0" again but this has no effect on the output of NOR gate 332 since the upper input of this NOR gate continues to receive a "1".

The final occurrence in the cycle is the reopening of the window switch which produces a "1" signal on terminal 10 in FIG. 2. This has the effect of resetting the cross-coupled flip-flops but has no other effect on the circuit.

Specifically, the "1" signal on conductor 20 is presented to the upper input of NOR gate 22 but since NOR gate 22 was previously receiving a "1" input at its lower input, there is no change in its output on conductor 26. The "1" signal on conductor 20 passed through inverter 24 produces a "0" signal on the upper input of NOR gate 32 and since this NOR gate now has two "0" signals as inputs, its output changes from a "0" to a "1" and this signal is fed to the lower input of NOR gate 36. NOR gate 36 had previously been receiving two "0" signals as its inputs so its output now changes from a "1" to a "0" on conductor 44 which signal is presented to the upper input of NOR gate 86 and to the lower input of NOR gate 62. The output of NOR gate 86 does not change since it had previously been receiving a "1" on its lower input and the output of NOR gate 62 does not change since it had previously been receiving a "1" on its upper input. The "0" signal on the output of NOR gate 36 does, however, change the input signal to the lower input of NOR gate 28 and since this NOR gate now receives two "0" signals as inputs, its output will change to a "1" on conductor 42. This signal is presented to the upper input of NOR gate 82 but since the lower input terminal had previously been receiving a "1", there is no output change from this NOR gate. The "1" signal on conductor 42 is also presented to the lower input of NOR gate 52 which had previously been receiving two "0" input signals so that its output now changes to a "0" on conductor 56. This does not effect the output of NOR gate 58 since the lower input of this NOR gate had previously been receiving a "1" signal.

At time $T_{13}$, which is the beginning of the next cycle, the sync switch reopens and the signal appearing on terminal 12 again becomes a "1" and the circuit is in the same situation it was at time $T_1$, previously described.

It should be noted that due to the ability to rapidly charge capacitor 366, $C_D$, from the current mirror and since the driving of the motor is independent of the charging of capacitors 272, $C_F$, and 288, $C_N$, it is possible to make the active scan, i.e., the time between sync switch opening at $T_1$ and the sync switch closing at $T_9$, larger than the return scan between $T_9$ and $T_{13}$. This allows the velocity of the scan mirror to be reduced during the active portion of the scan which will decrease the focus delay for improved low illumination operation.

In an actual embodiment of the present invention, the following circuit components of FIG. 1 may have the following values:

| | |
|---|---|
| System potential | 5.8 Volts |
| All NOR gates | CD-4001 |
| All inverters | CD-4049 |
| All amplifiers | RCA-3130 |
| All NPN transistors | 2N 3904 |
| All PNP transistors | 2N 3906 |
| Resistors 26,56,132,142,106 | 20K Ohms |
| Resistors 154,156,310 | 50K Ohms |
| Resistor 146 | 1.8K Ohms |
| Resistor 354,206 and 125 | 100 Ohms |
| Resistor 360 | 50 Ohms |
| Resistor 350 | 75K Ohms |
| Resistor 252 | 3.3K Ohms |
| Resistor 254 | 5.6K Ohms |
| Resistor 246 | 500 Ohms |
| Resistor 262 | 10K Ohms |
| Resistor 274, RF | 200K Ohms |
| Resistor 302, RN | 200K Ohms |
| Resistor 368, RD | 200K Ohms |
| Resistor 29R, RM | 3K Ohms |
| Capacitor 272, CF | 0.1 μf |
| Capacitor 288, CN | 0.1 μf |
| Capacitor 366, CD | 0.1 μf |

It is thus seen that I have provided an improved continuous focus proportional controller having the advantages of a continuous motor drive for large focus errors, a large active scan duty cycle, a minimum drive pulse width to overcome motor static friction and electronic debouncing of the window and sync switches. Many changes and modifications will occur to those skilled in the art and I do not intend to be limited by the description used in connection with the preferred embodiments. For example, I have shown signal storage means as capacitors $C_F$, $C_N$ and $C_D$ respectively being brought to the reference potential and charging towards the system source potential at various times during the operation, it should be realized that other types of signal storage means, e.g., counters, may be employed and that other base state conditions and limit state conditions, e.g., count levels, could be substituted for the reference and system potentials respectively. A novel system employing counters is described and claimed in my pending application Ser. No. 834,852 filed on even date herewith. Accordingly, I intend to be limited only by the appended claims.

I claim:

1. Apparatus for use with an autofocus system which includes an optical element to be positioned priximate a desired focus position, the system producing first, second and third output signals each of which may change between first and second states during operation of the system comprising:

first storage means connected to the system, operable, upon the occurrence of a change in the first signal from its first state to its second state to assume a reference state and operable, upon the occurrence of a change in the second signal from its second state to its first state to change state with time towards a limit state;

second storage means connected to the system, and to said first storage means, operable, whenever the second signal is in its second state to assume the reference state during those times when the third signal is in its first state and to change state with time towards the limit state during times when the third signal is in its second state, and operable, whenever the second signal is in its first state, to hold its own state during times when the third signal is in its second state and to assume the state of said first storage means during times when the third signal is in its first state;

third storage means connected to the system and to said second storage means and operable upon the occurrence of a change in the first signal from its second state to its first state to assume the state of said second storage means; and motive means connected to said third storage means and to the optical element to move the optical element toward the desired focus position in accordance with the state of said third storage means.

2. Apparatus according to claim 1 including:
direction means connected to the system and to said motive means and operable to cause said motive means to move the optical member in a first or opposite direction depending upon whether the last change of the third signal from its first state to its second state occurs before or after the change of the second signal from its second state to its first state.

3. Apparatus according to claim 2 including:
a source of third potential, and,
means connecting said motive means to said source of third potential whereby said motive means will move the optical element regardless of the absence of a potential on said third storage means.

4. Apparatus for use with an autofocus system which includes a lens for providing a proper focus for an image of an object in a field of view, radiation sensitive means, scanning means which cyclically scans the field of view first in an active portion of the scan from a first position to a second position and then in a return portion of the scan from the second position back to the first position so as to transmit radiation from the field of view to the radiation sensitive means, electronic means connected to said radiation sensitive means and operable to produce an output signal after the end of the active portion of a scan, the magnitude of such signal being indicative of the error between the actual position of the lens and the desired position of the lens for proper focus of the object, and motive means connected to move the lens towards the desired position in accordance with the output signal, comprising:

signal storage means connected between the autofocus system and the motive means and operable to receive the output signal from the system and to hold it while the scanning means continues to scan so that the motive means may operate during both the active portion of the scan and the return portion of the scan.

5. Apparatus according to claim 4 including direction means connected to the system and to the motive means and operable to determine the direction the lens moves to achieve proper focus.

6. Apparatus according to claim 5 including characterized drive means connected to said scanning means and operable to cause the active portion of the scan to occupy a larger portion of the scanning cycle than the return portion of the scan.

7. Apparatus according to claim 5 including:
a signal source, and
means connecting said signal source to the motive means so that the motive means will move the lens in the absence of a signal on said signal storage means.

8. In an autofocus system including a lens to be positioned by motive means so as to properly focus an image of an object within the field of view of the lens, a scanning member movable between a first position and a second position so as to transmit radiation from the field of view to radiation sensitive means and including radiation detection circuitry connected to the radiation sensitive means and operable to produce an autofocus signal which changes from a first to a second state each time the radiation detection circuitry detects that the scanning member is at a position indicative of a possible range to the object and which changes from the second state back to the first state when the radiation detection circuitry detects that the scanning member is approaching another position indicative of a more probable range to the object, the last of such transitions from the first to the second state during a scan between the first position and the second position being indicative of the proper range of the object, the autofocus system producing a first sync signal when the scanning member is proximate the first position and a second sync signal when the scanning member is proximate the second position and producing a relative position signal when the scanning member is in a position indicative of the position of the lens, the improvement comprising:

a source of system signal;
a source of reference signal;
focus control electronics including first signal storage means, second signal storage means and third signal storage means, connected to the radiation detection circuitry to receive the autofocus signal and being connected to the lens and the scanning means to receive the first and second sync signals and the relative position signal and having an output connected to said motive means to provide for operation thereof; said focus control electronics operable upon receipt of the first sync signal to bring the signal on said first and second signal storage means to the reference signal level, the first signal storage means remaining at the reference signal level until said focus control electronics receives a relative position signal and thereafter the first signal storage means being brought, with time, towards the system signal level;

the second signal storage means remaining at the reference signal level, prior to the occurrence of the relative position signal, until the occurrence of an autofocus signal from the first to the second state and thereafter the second signal storage means being brought, with time, towards the system signal level until either (i) the autofocus signal returns from the second state to the first state in which case the second signal storage means is brought back to the reference signal level, or (ii) the focus control electronics receives a relative position signal in which case the second signal storage means is caused to retain whatever signal level it had achieved, such signal level being indicative of the time between the most recent autofocus signal transition from the first to the second state and the occurrence of the relative position signal; subsequent to the relative position signal, the second signal storage means remaining at the level it had attained until either (i) another autofocus signal transition from the second state to the first state is received, in which case the focus control electronics causes the second signal storage means to be brought to the level of the first signal storage means and thereafter rise with the first signal storage means towards the system signal level until the occurrence of another autofocus signal transition from the first state to the second state at which time the second signal storage means thereafter retains whatever signal the first and the second signal storage means had achieved until either another autofocus signal transition occurs or the second sync signal is received, or (ii) the second sync signal is received; upon the occurrence of the second sync signal, the signal level on the second signal storage means being indicative of the time between the relative position signal occurrence and the last autofocus signal transition from the first to the second state and thus being indicative of the error between the present lens position and the lens position for the proper range of the object;

said focus control electronics causing the signal level of the third storage means to be brought to the level of the second signal storage means upon the occurrence of the second sync signal and thereafter to be brought, with time, back towards the source of reference signal level, the signal level on the third storage means being connected to the output of said focus control electronics so as to drive the motive means in accordance with the signal on the third storage means.

9. Apparatus according to claim 8, wherein further means are connected between said focus control electronics and said motive means so that said motive means is energized in a first or a second direction depending upon whether the last autofocus signal transition from the first to the second state occurred prior to or after the occurrence of the relative position signal.

10. Apparatus according to claim 9 including:
a source of third signal, and
means connecting the motive means to said source of third signal so as to move said motive means in the absence of a signal on said third storage means.

11. Apparatus according to claim 8 and including characterized drive means connected to move the scanning member from the first position to the second position at a first rate and to move the scanning member from the second position back to the first position at a second rate.

* * * * *